US007022194B2

(12) United States Patent
Ennis

(10) Patent No.: US 7,022,194 B2
(45) Date of Patent: Apr. 4, 2006

(54) METHOD OF TREATING A PAINT BOOTH DRY FILTER

(75) Inventor: Ronnie Joe Ennis, Kingston, OK (US)

(73) Assignee: Enchem Chemical Products, Inc, Oklahoma City, OK (US)

( * ) Notice: Subject to any disclaimer, the term of this patent is extended or adjusted under 35 U.S.C. 154(b) by 0 days.

(21) Appl. No.: 11/120,036

(22) Filed: May 2, 2005

(65) Prior Publication Data

US 2005/0194321 A1 Sep. 8, 2005

Related U.S. Application Data

(62) Division of application No. 10/202,378, filed on Jul. 24, 2002.

(51) Int. Cl.
*B06B 3/08* (2006.01)

(52) U.S. Cl. .................... 134/38; 55/DIG. 46; 95/281; 210/734; 210/930; 405/129.25

(58) Field of Classification Search .......... 55/DIG. 46; 95/152, 155, 281; 96/233; 134/38; 210/712, 210/721, 725, 727, 728, 734, 754, 764, 930; 252/180, 181; 405/129.25
See application file for complete search history.

(56) References Cited

U.S. PATENT DOCUMENTS 3,616,603 A * 11/1971 Warner ........................ 95/273
4,067,806 A 1/1978 Mauceri
4,295,932 A 10/1981 Pocius
5,116,514 A 5/1992 Bhattacharyya et al.
5,298,186 A 3/1994 Mitchell et al.
5,330,659 A 7/1994 Schapira et al.
5,684,053 A 11/1997 Spangler
5,702,516 A * 12/1997 Spangler ................ 106/287.35
5,730,881 A 3/1998 Miknevich
5,976,225 A * 11/1999 Nystrom et al. .............. 95/278
6,027,566 A * 2/2000 Telchuk et al. ............. 118/326
6,136,200 A 10/2000 Waldmann
6,162,270 A * 12/2000 Nystrom et al. ........... 55/385.2
6,231,646 B1 * 5/2001 Schweizer et al. ............. 96/17

* cited by examiner

*Primary Examiner*—Peter A. Hruskoci
(74) *Attorney, Agent, or Firm*—Dunlap, Codding & Rogers, P.C.

(57) ABSTRACT

The present invention includes a composition having detackifying and detoxifying properties such that the composition is useful for detackifying and detoxifying paint particles in spray booth water and for treating a paint booth dry filter to render the filter fire retardant, non-combustible and non-hazardous to enable disposal of a used dry filter in a standard landfill. The present invention also includes a method for the detackification and detoxification of oversprayed paint in a paint spray booth system wherein said oversprayed paint comes into contact with water of a waste water system.

22 Claims, No Drawings

METHOD OF TREATING A PAINT BOOTH DRY FILTER

CROSS-REFERENCE TO RELATED APPLICATIONS

The present application is a divisional of U.S. Ser. No. 10/202,378, filed Jul. 24, 2002, the entirety of which is hereby expressly incorporated by reference herein.

STATEMENT REGARDING FEDERALLY SPONSORED RESEARCH OR DEVELOPMENT

Not applicable.

BACKGROUND OF THE INVENTION

In modern paint technology, automatic spraying techniques are often used for painting large articles or parts of articles, such as automobile bodies and electrical appliances such as refrigerators, in enclosed areas called paint spray booths. These booths have several purposes: (1) to contain any fumes or paint overspray, (2) to reduce the risk of contamination of the part being painted, and (3) to protect the health of the workers at the site. It is estimated that between about 20% to about 40% of the total volume of paint sprayed is overspray. In the application of organic paints such as epoxy resins, enamel paints and the like, it is necessary to trap the oversprayed paint. Smaller booths may employ filters to remove the paint overspray from the air, while larger systems usually use a recirculating water system for this purpose. In operation, the object to be painted generally passes through the work area of the booth. Air flow through the booth forces the paint overspray into intimate contact with the recirculating water, thereby effectively scrubbing the paint solids from the air into the water. This may be accomplished by forcing the air through any one of a water curtain, some type of water spray or a venturi scrubber, but the net effect of any of these processes is that oversprayed paint contacts and is captured by the recirculating water of the spray booth.

The amount of oversprayed paint contacting recirculating water in a paint spray booth may change depending on a number of variables, such as plant or process shutdowns, the size and shape of the object being painted, the type of spray equipment used, the spraying and purge techniques used, the type of paint used and the water flow rate. Even though improved coating methods have significantly reduced the amount of paint overspray, up to about 50% of the total paint sprayed may not reach the object being painted. As a result, significant concentrations of paint can build up in the system. Since the majority of paints used today must be baked at elevated temperatures in order to cure properly, the paint utilized can remain tacky indefinitely. The paint may coalesce into a mass of sticky material that can plug pipes, fans and recirculation pumps as well as build up on the walls of the paint spray booth itself, thus significantly reducing scrubbing efficiency in the booth and leading to an air imbalance which would not only result in a poor paint finish but also allow hazardous paint emissions to be discharged into the air. These conditions may also result in serious safety hazards to paint spray booth personnel. Federal regulations now limit the amount of volatile organic compounds (VOCS) that can be released at a given plant site, and organic solvent diluents used in solvent-based paint are a major source of VOCS. These VOCS are spontaneous combustion hazards.

Generally, the water collecting the paint overspray is recycled, and in order to ensure that the process continues to work efficiently, the paint must be collected and removed from the water. There is therefore a need to detackify the oversprayed paint so that it can be removed easily, thereby enabling filtration and recirculation of water through the system. Preferably, matting or coagulation of the oversprayed paint is also promoted so that the paint solids will either float so that they can be removed from the surface of the aqueous liquid in the spray booth, or the paint solids will sink so that they can be removed by sedimentation. However, efficient separation of the paint solids from the recirculating water to prevent clogging of the system can be expensive.

In addition, the resultant solid waste product collected by the filters of the wash booths are heavily contaminated with toxic materials and must be disposed of as hazardous waste. Disposal as hazardous waste requires the use of a hazardous materials disposal company, which can be very expensive.

The detackifying process (also known as paint denaturating or paint killing) takes place in the water phase by the addition of chemicals thereto. In addition, detackification is necessary because it prevents paint fouling the internal surfaces of the booth and of pipes, which may cause blockages. Collection of paint on the internal surfaces is undesirable because paint deposits formed on the internal walls of the booth are subject to the growth of anaerobic bacteria which generate corrosive and foul-smelling substances due to anaerobic decomposition of organic substances.

A variety of paint detackifier compositions have been described in the prior art, for example, in U.S. Pat. No. 6,136,200, issued to Waldmann on Oct. 24, 2000; U.S. Pat. No. 5,730,881, issued to Miknevich on Mar. 24, 1998; U.S. Pat. No. 5,298,186, issued to Mitchell et al on Mar. 29, 1994; U.S. Pat. No. 5,250,191, issued to Cory et al on Oct. 5, 1993; and U.S. Pat. No. 5,192,449, issued to Huang et al on Mar. 9, 1993, the contents of which are all expressly incorporated herein in their entirety by reference. However, the technology has not reached a fully satisfactory level, and the prior art detackifiers still result in the production of toxic solid waste and contaminated filters that must be disposed of as hazardous waste.

Therefore, there is a need in the art for improved compositions and methods for treatment of waste and filters from paint spray booths that overcome the cleanup, environmental and combustibility concerns of the prior art. It is to such improved compositions having detackification, detoxification and neutralization of combustibility properties and methods of using same in the treatment of waste and filters from paint spray booths that the present invention is directed.

SUMMARY OF THE INVENTION

The present invention is related to a composition and methods for processing waste compositions, and in particular, waste and filters from paint spray booths.

It is an object of the present invention to provide a composition having detackification, detoxification and neutralization of combustibility properties wherein the composition may be utilized as a paint spray booth treating agent suitable for addition to the recirculating water and which will provide superior and substantially complete paint detackification and detoxification.

It is another object of the present invention, while achieving the before-stated object, to provide a method of detackifying and detoxifying oversprayed paint in a paint spray operation wherein the oversprayed paint comes into contact with the water of a waste water system.

It is yet another object of the present invention, while achieving the before-stated objects, to provide a method for the detoxification of paint booth dry filters.

Other objects, features and advantages of the present invention will become apparent from the following detailed description when read in conjunction with the accompanying drawings and appended claims.

DETAILED DESCRIPTION OF THE INVENTION

The present invention is related to a composition that detackifies, detoxifies and neutralizes combustibility in solvent based paints and coatings. The composition may be utilized in methods of processing waste compositions, such as paint spray booth waste. Such methods of processing waste compositions include matting and floating wastes in water traps as well as collecting waste in dry filters. The methods of the present invention inhibit accumulation of raw paint masses or sludge within the pumps, pipes, reservoirs, spray booth surfaces, or other internal components of a spray booth apparatus. The use of the composition of the present invention will result in a waste product that is rendered safe for standard EPA-approved landfill disposal and will therefore not require disposal as hazardous materials, which can be both time-consuming and expensive. Additionally, utilizing the methods of the present invention, the waste product, as well as filters used in the process of collecting the waste product, are rendered fire retardant, thereby overcoming the spontaneous combustion hazards of the prior art.

The term "paint" as used herein includes paint in its ordinary sense, that is, a mixture of pigment and a suitable liquid vehicle that is reasonably fluid and provides a thin and adherent coating when spread on an appropriate surface. The term "paint" as used herein also includes other paint-like fluid coating materials. Hence, the term "paint" as used herein refers to paints such as solvent-based paints, lacquers, varnishes, base coats, clear coats and the like.

The term "solvent-based paints" as used herein refers to all varieties of water-insoluble coatings applied in spraying operations, including but not limited to, oil based paints, enamels, urethanes and lacquers. If untreated, these products readily adhere to the walls of spray booth systems and to any other surfaces that they contact, such as the surfaces of water distribution piping, spray nozzles, and the like.

A primary concern with utilizing solvent-based paints is the tacky or adhesive nature of the over-sprayed coating material. Due to their hydrophobicity, solvent-based solids tend to coalesce and accumulate on the walls, ceilings and floors of spray areas and to clog water spray equipment, recirculating pumps and the like. Thus, the over-sprayed paint mist captured in the water system of a spray booth must be detackified, or "killed," to prevent adherence to the walls, piping, etc., of the spray booth system.

Paint that sticks to spray booth surfaces usually cannot be easily removed from the equipment and tends to build up over time, thereby hampering spray booth efficacy. Therefore, it is desirous to detackify the paint overspray and thereby prevent the paint overspray from sticking to unwanted surfaces.

The terms "detackify" and "detackification" as used herein will be understood to mean that the adhesive properties or tackiness of the paint overspray are minimized or substantially eliminated.

The composition of the present invention has detackification, detoxification and neutralization of combustibility properties such that the composition is useful for detackifying and detoxifying paint particles in spray booth water as well as paint accumulated in paint filter systems. The composition of the present invention detackifies, mattes, floats, detoxifies, neutralizes combustibility and eliminates odor of solvent based coatings in water filter paint booths.

The composition of the present invention is an aqueous mixture having a pH in a range of from about 7.0 to about 8.5, preferably in a range from about 7.5 to about 8.0, and most preferably about 8.0, and containing an effective minor amount of a high molecular weight, high charge density, dry cationic polymer capable of detackifying, matting, floating, detoxifying, neutralizing combustibility and eliminating odor of solvent based coatings in water filter paint booths in accordance with the present invention. The preferred molecular weight range for the high molecular weight, high charge density, dry cationic polymer is in a range of from about 7.5 million to about 8.0 million. A most preferred molecular weight for the high molecular weight, high charge density, dry cationic polymer is about 7.556 million. The high molecular weight, high charge density, dry cationic polymer is preferably a 100% active high molecular weight, high charge density, dry cationic polyacrylamide; however, various high molecular weight, high charge density, dry cationic polymers may be used in the composition of the present invention as long as the resultant composition formed therefrom is capable of functioning as described herein above. A commercially available compound that may be utilized as the high molecular weight, high charge density, dry cationic polymer of the composition of the present invention is P-611 (Chemco Products, Inc., Howell, Mich.). P-611 is a 100% active dry cationic polyacrylamide which has been used in the past to flocculate biological wastewater treatment solids, providing superior clarification and sludge dewatering. P-611 is an odorless, beaded white powder having a bulk density of about 50 lbs./ft$^3$, and about 1% solubility in water. A 0.25% solution of P-611 has a pH of about 8.0 and a viscosity of about 100 cps.

The minor effective amount of the high molecular weight, high charge density, dry cationic polymer present in the aqueous mixture is that amount required for detackifying, matting, floating, detoxifying, neutralizing combustibility and eliminating odor of solvent based coatings in water filter paint booths. Desirably, the minor effective amount of high molecular weight, high charge density, dry cationic polymer is in a range of from about 0.75% to about 5% by weight of the aqueous mixture, more preferably from about 0.75% to about 2.0% by weight of the aqueous mixture, and most preferably, about 1.0% by weight of the aqueous mixture.

The composition of the present invention may also include an antibacterial agent to prevent growth of bacteria in the composition. Any antibacterial agent known in the art may be utilized in the present invention as long as such antibacterial agent does not interfere with the detackifying, matting, floating, detoxifying, neutralizing combustibility and eliminating odor properties of the composition of the present invention. Examples of such antibacterial agents include chlorine, DOWICIDE™-A (Dow Chemical, St. Louis, Mo.), and the like. When employed, the amount of antibacterial agent present in the composition will be that amount effective to inhibit bacterial growth. Generally, however, the effective amount of antibacterial agent is in a range of from about 0.01% to about 3.0% by weight of the composition, more preferably in a range of from about 0.01% to about 0.25% by weight of the composition, and most preferably about 0.05% by weight of the composition.

The composition of the present invention may also include a defoaming agent to control foaming in the paint booth water trap. Any defoaming agent known in the art may be utilized in the present invention as long as such defoaming agent does not interfere with the detackifying, matting, floating, detoxifying, neutralizing combustibility and eliminating odor properties of the composition of the present invention. Examples of such defoaming agents include D-FOAM 100 (Enchem Chemical Products, Inc., Kingston, Okla.; D-FOAM 100 is comprised of about 50% kerosene and about 50% tributoxyethyl phosphate (such as KP140, G. S. Robins, St. Louis, Mo.)), a SAG™ antifoam, such as SAG™-275D (Crompton Corp, Greenwich, Conn.), OS469 Defoamer (OSTEC, Dallas, Tex.), and the like. When employed, the amount of defoaming agent present in the composition will be that amount effective to control foaming in the paint booth water trap. Generally, however, the effective amount of defoaming agent is in a range of from about 0.1% to about 1% by weight of the composition, and more preferably in a range of from about 0.1% to about 0.2% by weight of the composition.

The composition of the present invention is prepared by adding the high molecular weight, high charge density, dry cationic polymer (which is stored at about 73° F. in dry storage) very slowly into a mixing tank in which the appropriate amount of water is being stirred by a mixer, thereby producing a fluid mixture. Only a few ounces of high molecular weight, high charge density, dry cationic polymer are added to the water per hour, and the fluid mixture is mixed until the high molecular weight, high charge density, dry cationic polymer is well dispersed and starts to thicken. After the desired concentration of high molecular weight, high charge density, dry cationic polymer has been introduced, the mixer is stopped, and the fluid mixture is allowed to stand for a period of time from at least about 8 hours to about 24 hours. The resulting fluid mixture has a clear but lumpy appearance. The clear, lumpy mixture is stirred until the lumps are dispersed completely, and a substantially homogeneous (uniform) mixture is formed. The pH of the resultant mixture is then measured. The pH of the resultant mixture is desirably in a range of from about 7 to about 10, more preferably in a range of from about 7.5 to about 9, and most preferably about 8. If the pH is above the desired pH or pH range, such as above about 8.0 or about 8.5, an acid is added to lower the pH to the desired pH or pH range. A variety of acids may be utilized in the preparation of the composition of the present invention, and it is within the skill of one of ordinary skill in the art to identify and select compounds that function as acids and that may be utilized herein. Examples of acids that may be utilized in accordance with the present invention include phosphoric acid, acetic acid, hydrochloric acid, sulfuric acid and the like. If the pH of the resultant mixture is below the desired pH or pH range, such as below about 7.0 or about 7.5, a base is added to raise the pH to the desired pH or pH range. A variety of bases may be utilized in the preparation of the composition of the present invention, and it is within the skill of one of ordinary skill in the art to identify and select bases that may be utilized herein. Examples of bases that may be utilized in accordance with the present invention include sodium hydroxide, potassium hydroxide, ammonia, sodium metasilicate and the like.

Following adjustment of the pH, if desired, any antibacterial agents, defoaming agents, or other additions to the resultant mixture may be made to provide the composition of the present invention. Once prepared, the composition may be diluted for various uses, depending on the particular application desired. Any dilution factor may be utilized as long as the composition maintains the detackification, detoxification and neutralization of combustibility properties described herein and can function in accordance with the present invention. Preferably, the dilution is in the range from about 1:7 to about 1:20. In addition, the pH of the composition of the present invention may be adjusted following dilution if desired for a particular application. For example, it is desired when using the composition of the present invention to treat paint overspray in wash water booths to dilute the composition in water to a composition: water ratio of about 1:20, and then adjust the pH of the resultant solution with any of the bases described herein above to a pH of about 10.5.

The present invention encompasses a method for the detackification and detoxification of oversprayed paint in a paint spray booth system wherein the oversprayed paint comes into contact with water of a waste water system. The method comprises providing the composition of the present invention described herein above having detackification, detoxification and neutralization of combustibility properties, and dosing water of the waste water system with the composition such that the composition is present in the water of the waste water system in sufficient amount to detackify and detoxify oversprayed paint when the oversprayed paint comes into contact with the water.

In a preferred embodiment of the method of the present invention, the composition of the present invention is applied to the water such that the composition:water ratio is from about 1:5 to about 1:30, preferably, at a composition: water ratio of about 1:20. The pH of the system is then balanced to about 10.5, and a defoaming agent as described herein above may be added to control foaming in the paint booth water trap.

Paint sludge that is formed generally floats on or near the top of the water present in the wash water booth. One of the advantages of the present invention is that it aids in matting and floating of the paint sludge. Removal of the paint sludge on or near the top of the water may be accomplished using one or more of a variety of systems, such as by skimming, screening, straining, dispersing the sludge in the water of the system and then discharging a portion of such water, and the like. The matted and coagulated solid waste resulting by the use of the composition and method of the present invention is non-toxic and non-hazardous to an operator of the system, and therefore the operator can actually lift the harmless waste out of the wash water booth with their bare hands and dispose of the waste in normal, non-hazardous trash.

A preferred method of removing the paint sludge involves the use of filters to collect the solid waste. The composition of the present invention may be utilized for soaking and treating used paint booth dry filters; therefore, another embodiment of the present invention includes a method for treating paint filter systems to detoxify the paint. The method includes providing the composition described in detail herein above, mixing the composition with filter soak water to provide a resultant mixture having a composition: water ratio in a range of from about 1:5 to about 1:10, and preferably about 1:7, and soaking the paint booth dry filter in the resultant mixture for a period of time effective to detackify, detoxify and remove paint present on the paint booth dry filter.

Without further elaboration, it is believed that one skilled in the art, given the preceding detailed description, can utilize the invention to its fullest extent. The following examples are provided to illustrate the invention, but are not to be construed as limiting the invention in any way except as indicated in the appended claims. The examples provided herein include one embodiment of the present invention; other embodiments will become apparent to those skilled in the art from a consideration of the Specification or practice of the invention disclosed herein. It is to be understood that modifications and variations may be practiced without departing from the spirit and scope of the novel concepts of the invention.

EXAMPLE 1

Table I lists the ingredients and formula for one embodiment of the composition of the present invention.

TABLE I

| % | Raw Materials | LBS/55 GAL | GAL/55 GAL |
|---|---|---|---|
| 99.00 | Water | 453.57 | 54.45 |
| 1.00 | P-611 | 4.58 | |
| 100.00 | TOTALS | 458.15 | 55.00 |

The composition set forth above was prepared using the following procedure. 453.57 lbs (54.45 gal) of water was introduced into a mixing tank. The water was stirred with a power mixer until a good vortex was formed. The high molecular weight, high charge density, dry cationic polymer was slowly sifted into the vortex using an aspiration funnel with an access hose, while the water was stirred at about 400 rpm. Only a few ounces of polymer were added per hour, and the mixing was continued until the polymer was well dispersed and started to thicken. After the raw polymer material had been introduced, the mixer was stopped, and the fluid mixture was allowed to stand about 12 hours. The resulting fluid mixture had a clear but lumpy appearance. The clear, lumpy mixture was then stirred until the lumps were dispersed and a substantially homogeneous (uniform) mixture was produced. The pH of the product was then adjusted to about 8.0.

EXAMPLE 2

TABLE II

| % | Raw Materials | LBS/55 GAL | GAL/55 GAL |
|---|---|---|---|
| 98.95 | Water | 453.32 | 54.42 |
| 1.00 | P-611 | 4.58 | |
| 0.05 | Chlorine | 0.25 | |
| 100.00 | TOTALS | 458.15 | 55.00 |

The composition set forth above was prepared using the following procedure. 453.32 lbs (54.42 gal) of water was introduced into a mixing tank. The water was stirred with a power mixer until a good vortex was formed. The high molecular weight, high charge density, dry cationic polymer was slowly sifted into the vortex using an aspiration funnel with an access hose, while the water was stirred at about 400 rpm. Only a few ounces of polymer were added per hour, and the mixing was continued until the polymer was well dispersed and started to thicken. After the raw polymer material had been introduced, the mixer was stopped, and the fluid mixture was allowed to stand about 12 hours. The resulting fluid mixture had a clear but lumpy appearance. The clear, lumpy mixture was then stirred until the lumps were dispersed and a substantially homogeneous (uniform) mixture was produced. The pH of the product was then adjusted to about 8.0, and 0.25 lb of chlorine was added to the resulting fluid mixture and mixed well.

EXAMPLE 3

To treat paint overspray in a water wash booth, either of the compositions prepared above in Example 1 or 2 was diluted in water to a composition:water ratio of about 1:20. The pH of the resultant diluted composition was then adjusted to about 10.5 using PH-100 (Enchem Products, Inc., Kingston, Okla.). D-FOAM 100 (Enchem Products, Inc., Kingston, Okla.) was added to a concentration of about 0.1% to control foaming in the paint booth water trap. The PH-100 product comprises sodium metasilicate, which also slicked the water and substantially prevented paint from sticking to metal surfaces in the paint booth.

EXAMPLE 4

To treat paint booth dry filter systems, either of the compositions prepared above in Example 1 or 2 was diluted in filter soak water to a composition:water ratio of about 1:7. The paint booth filter was then soaked in the resultant diluted composition to detoxify and remove paint from the paint booth filter.

As mentioned above, one of the advantages of the composition and methods of the present invention is that the resulting waste products are detoxified so that the waste may be disposed in normal, nonhazardous trash. Shown in Table III are laboratory results of an analysis of the presence of hazardous organics and heavy metals on the paint filter treated as described herein in Example 4. As evidenced by the results in Table III, all of the organics and metals present in the sample of waste are well below the regulatory limits. Thus, using the criteria of toxicity characteristics, the sample of waste analyzed in Table III is not considered hazardous for the parameters tested, and therefore does not require hazardous waste disposal.

TABLE III

| Analyte | Result (mg/l) | Regulatory Limit |
|---|---|---|
| Organics | | |
| Benzene | <0.003 | 0.05 |
| Carbon tetrachloride | <0.003 | 0.05 |
| Chlorobenzene | <0.003 | 100.0 |
| Chloroform | <0.003 | 6.0 |
| 1,4-Dichlorobenzene | <0.003 | 7.5 |
| 1,2-Dichloroethane | <0.003 | 0.5 |
| 1,1-Dichloroethylene | <0.003 | 0.7 |
| Methyl ethyl ketone | <0.111 | 200.0 |
| Tetrachloroethylene | <0.003 | 0.7 |
| Trichloroethylene | <0.003 | 0.5 |
| Vinyl chloride | <0.005 | 0.2 |
| Metals | | |
| Chromium | <0.05 | 5.0 |
| Lead | <0.05 | 5.0 |
| Nickel | <0.05 | — |

From the above description, it is clear that the present invention is well adapted to carry out the objects and to attain the advantages mentioned herein as well as those inherent in the invention. Although the invention has been described in conjunction with specific embodiments thereof, it is evident that many alternatives, modifications, and variations will be apparent to those skilled in the art.

Accordingly, it is intended to embrace all such alternatives, modifications, and variations that fall within the spirit and broad scope of the appended claims.

What is claimed is:

1. A method for detoxification of a paint booth dry filter having paint thereon, comprising the steps of:

providing a composition having detackification, detoxification and neutralization of combustibility properties, the composition comprising an aqueous mixture having a pH in a range of from about 7.5 to about 9 and containing an effective minor amount of cationic polymer having a molecular weight of at least about 7.5 million such that the composition is useful for detackifying and detoxifying paint particles in spray booth water;

mixing the composition with filter soak water to provide a resultant mixture having a composition:water ratio in a range of from about 1:5 to about 1:10; and soaking the paint booth dry filter having paint thereon in the resultant mixture for a period of time effective to detoxify and remove paint present on the paint booth dry filter.

2. The method of claim 1 wherein, in the step of providing the composition, the cationic polymer has a molecular weight in a range of from about 7.5 million to about 8.0 million.

3. The method of claim 1 wherein, in the step of providing the composition, the effective minor amount of the cationic polymer is a concentration in the range of from about 0.5% to about 2%.

4. The method of claim 3 wherein, in the step of providing the composition, the concentration of cationic polymer is about 1.0%.

5. The method of claim 1 wherein, in the step of providing the composition, the pH of the composition is about 8.0.

6. The method of claim 1 wherein, in the step of providing the composition, the pH of the composition is about 9.0.

7. The method of claim 1 wherein, in the step of providing the composition, the cationic polymer is a cationic polyacrylamide.

8. The method of claim 1 wherein, in the step of providing the composition, the composition further comprises an antibacterial agent for inhibition of bacterial growth.

9. The method of claim 8 wherein the antibacterial agent is chlorine.

10. The method of claim 1 wherein, in the step of mixing the composition with filter soak water to provide a resultant mixture, the resultant mixture has a composition:water ratio of about 1:7.

11. A method of treating a paint booth dry filter to render the paint booth dry filter fire retardant and non-hazardous to enable disposal of the paint booth dry filter in a standard landfill, comprising:

providing a composition having detackification, detoxification and neutralization of combustibility properties, the composition comprising an aqueous mixture having a pH in a range of from about 7.5 to about 9 and containing an effective minor amount of a cationic polymer having a molecular weight of at least about 7.5 million such that the composition is useful for detackifying and detoxifying paint particles in spray booth water;

mixing the composition with filter soak water to provide a resultant mixture having a composition:water ratio in a range of from about 1:5 to about 1:10; and soaking the paint booth dry filter in the resultant mixture for a period of time effective to detoxify and remove paint present on the paint booth dry filter thereby rendering the paint booth dry filter fire retardant and non-hazardous.

12. The method of claim 11 wherein, in the step of providing the composition, the cationic polymer has a molecular weight in a range of from about 7.5 million to about 8.0 million.

13. The method of claim 11 wherein, in the step of providing the composition, the effective minor amount of the cationic polymer is a concentration in the range of from about 0.5% to about 2%.

14. The method of claim 13 wherein, in the step of providing the composition, the concentration of cationic polymer is about 1.0%.

15. The method of claim 11 wherein, in the step of providing the composition, the pH of the composition is about 8.0.

16. The method of claim 11 wherein, in the step of providing the composition, the pH of the composition is about 9.0.

17. The method of claim 11 wherein, in the step of providing the composition, the cationic polymer is a cationic polyacrylamide.

18. The method of claim 11 wherein, in the step of providing the composition, the composition further comprises an antibacterial agent for inhibition of bacterial growth.

19. The method of claim 18 wherein the antibacterial agent is chlorine.

20. The method of claim 11 wherein, in the step of mixing the composition with filter soak water to provide a resultant mixture, the resultant mixture has a composition:water ratio of about 1:7.

21. The method of claim 11 comprising the additional step of disposing of the fire retardant and non-hazardous paint booth dry filter in a landfill.

22. The method of claim 21 wherein the landfill is a standard EPA-approved landfill.

* * * * *